(12) United States Patent
Saiz, Jr.

(10) Patent No.: US 10,016,084 B1
(45) Date of Patent: Jul. 10, 2018

(54) NESTED COOKWARE ASSEMBLY

(71) Applicant: Henry B. Saiz, Jr., Peoria, AZ (US)

(72) Inventor: Henry B. Saiz, Jr., Peoria, AZ (US)

(*) Notice: Subject to any disclaimer, the term of this patent is extended or adjusted under 35 U.S.C. 154(b) by 127 days.

(21) Appl. No.: 15/350,281

(22) Filed: Nov. 14, 2016

(51) Int. Cl.
*A47J 27/00* (2006.01)
*A47J 27/12* (2006.01)
*B65D 25/28* (2006.01)

(52) U.S. Cl.
CPC ............ *A47J 27/002* (2013.01); *A47J 27/12* (2013.01); *B65D 25/28* (2013.01)

(58) Field of Classification Search
CPC ...... A47J 27/002; A47J 37/0694; A47J 37/06; A47J 27/12; A47J 37/049; A47J 37/04; A47J 36/22; A47J 36/16; A47J 45/065; A47J 45/06; B65D 25/28; B65D 25/2835; B65D 21/0233
USPC .............. 220/756, 573.4, 762, 773, 912
See application file for complete search history.

(56) References Cited

U.S. PATENT DOCUMENTS

| | | | | |
|---|---|---|---|---|
| 2,007,250 | A * | 7/1935 | Kellner | B65F 1/16 220/212.5 |
| 3,096,707 | A * | 7/1963 | Mills | A47J 37/04 99/395 |
| 5,339,728 | A * | 8/1994 | Marchwiak | A47J 36/22 211/181.1 |
| 8,887,943 | B1 * | 11/2014 | Miller | A47J 39/006 206/557 |

* cited by examiner

Primary Examiner — Stephen Castellano
(74) Attorney, Agent, or Firm — Parsons & Goltry; Michael W. Goltry; Robert A. Parsons

(57) ABSTRACT

A cookware assembly includes a first vessel, a second vessel positioned removably on the first vessel, a rack, capable of supporting food thereon for cooking, positioned removably on the second vessel, and a handle mounted to the first vessel for movement between an open position detached from the rack and a closed position attached to the rack. The first vessel, the second vessel, and the rack are separable from one another, when the handle is in the open position. The first vessel, the second vessel, and the rack are inseparable, when the handle is in the closed position.

26 Claims, 19 Drawing Sheets

NESTED COOKWARE ASSEMBLY

FIELD OF THE INVENTION

The present invention relates to cookware and, more specifically, to pans and racks.

BACKGROUND OF THE INVENTION

Cooking food on a rack is useful because it allows greater airflow around the food to be cooked, such as meats and poultry, for more consistently even cooking results. Typically, a rack is set into a roasting pan, and the food is placed onto the rack, all of which is placed into the oven for cooking. When moved to and from the oven, the rack holding the food can slide across the pan, which can cause hot juices in the pan to splash onto and burn a person's skin. The rack and the food held by the rack can also fall out of the pan if the person carrying the pan slips or fumbles. Accordingly, there is a need in the art for a cookware assembly incorporating a rack which overcomes or at least partially ameliorates the abovementioned disadvantages and which at least provides the public with a useful choice.

SUMMARY OF THE INVENTION

According to the principle of the invention, a cookware assembly includes a first vessel, a second vessel positioned removably on the first vessel, a rack, capable of supporting food thereon for cooking, positioned removably on the second vessel, and a handle mounted to the first vessel for movement between an open position detached from the rack and a closed position attached to the rack. The first vessel, the second vessel, and the rack are separable from one another, when the handle is in the open position. The first vessel, the second vessel, and the rack are inseparable, when the handle is in the closed position. A detent assembly for retaining the handle to the rack when the handle is in the closed position includes a protuberant component and a strike component, one of the components is carried by the handle and the other of the components is carried by rack. The rack includes a base on the second vessel and a frame, capable of supporting food thereon that projects from base. The frame includes a handle above the first and second vessels for taking up the rack by hand or with an implement. The other of the components is carried by the handle of the frame, and the handle of the first vessel and the handle of the rack form an assembled handle above the first and second vessels when the handle of the first vessel is in the closed position and when the protuberant component is engaged to the strike component retaining the handle of the first vessel to the handle of the rack. The handle of the second vessel has a length, The handle of the frame has a length, the one of the components extends along the length of the handle of the second vessel, and the other of the components extends along the length of the handle of the frame. The second vessel includes a bottom surface, and a continuous sidewall extending from a periphery of the bottom surface. The base of the rack is a peripheral frame that corresponds to the periphery of the second vessel. The peripheral frame is on the bottom surface of the second vessel, the peripheral frame and the periphery of the second vessel are juxtaposed, and the peripheral frame encircles a majority of the bottom surface of the second vessel that is unobstructed by the rack and available for supporting food thereon for cooking.

According to the principle of the invention, a cookware assembly includes a first vessel, a second vessel positioned removably on the first vessel, a rack including a first member, and a second member mounted to the first vessel for movement between an open position detached from the first member and a closed position attached to the first member. The rack includes a base positioned removably on the second vessel, and a frame that projects from the base. The frame includes the first member above the first and second vessels, and a food-supporting framework between base and the first member. The first vessel, the second vessel, and the rack are separable from one another, when the second member is in the open position. The first vessel, the second vessel, and the rack are inseparable and the first member and the second member form an assembled handle above the first and second vessels, when the second member is in the closed position. A detent assembly for retaining the second member to the first member when the second member is in the closed position includes a protuberant component and a strike component, one of the components is carried by the first member and the other of the components is carried by the second member. The first member has a length, the second member has a length, the one of the components extends along the length of the first member, and the other of the components extends along the length of the second member. The second vessel includes a bottom surface, and a continuous sidewall extending from a periphery of the bottom surface. The base of the rack is a peripheral frame that corresponds to the periphery of the second vessel. The peripheral frame is on the bottom surface of the second vessel, the peripheral frame and the periphery of the second vessel are juxtaposed, and the peripheral frame encircles a majority of the bottom surface of the second vessel that is unobstructed by the rack and available for supporting food thereon for cooking.

According to the principle of the invention, a cookware assembly includes vessels and a rack. The vessels are nested releasably. one of the vessels is an outermost vessel and another one of the vessels is an innermost vessel. The rack is capable of supporting food thereon for cooking and is positioned removably on the innermost vessel. A handle is mounted to the outermost vessel for movement between an open position and a closed positioned attached to the rack. The vessels and the rack are separable from one another, when the handle is in the open position. The vessels and the rack are inseparable, when the handle is in the closed position. A detent assembly for retaining the handle to the rack when the handle is in the closed position includes a protuberant component and a strike component, one of the components is carried by the handle and the other of the components is carried by rack. The rack includes a base on the innermost vessel and a frame, capable of supporting food thereon that projects from base. The frame includes a handle above the vessels for taking up the rack by hand or with an implement. The other of the components is carried by the handle of the frame, and the handle of the outermost vessel and the handle of the rack form an assembled handle above the vessels when the handle of the outermost vessel is in the closed position and when the protuberant component is engaged to the strike component. The handle of the outermost vessel has a length, the handle of the frame has a length, the one of the components extends along the length of the handle of the outermost vessel, and the other of the components extends along the length of the handle of the frame. The innermost vessel includes a bottom surface, and a continuous sidewall extending from a periphery of the bottom surface. The base of the rack is a peripheral frame that corresponds to the periphery of the innermost vessel. The peripheral frame is on the bottom surface of the innermost vessel, the peripheral frame and the periphery of the innermost vessel are juxtaposed, and the peripheral frame encircles a majority of the bottom surface of the innermost vessel that is unobstructed by the rack and available for supporting food thereon for cooking.

According to the principle of the invention, a cookware assembly includes vessels and a rack. The vessels are nested releasably. One of the vessels is an outermost vessel and another one of the vessels is an innermost vessel. The rack includes a base positioned removably on the innermost vessel, and a frame that projects from the base. The frame includes a first member above the vessels, and a food-supporting framework between base and the first member. A second member is mounted to the outermost vessel for movement between an open position detached from the first member and a closed position attached to the first member. The innermost vessel, the outermost vessel, and the rack are separable from one another, when the second member is in the open position. The innermost vessel, the outermost vessel, and the rack are inseparable and the first member and the second member form an assembled handle above the vessels, when the second member is in the closed position. A detent assembly for retaining the second member to the first member when the second member is in the closed position includes a protuberant component and a strike component, one of the components is carried by the first member and the other of the components is carried by the second member. The first member has a length, the second member has a length, the one of the components extends along the length of the first member, and the other of the components extends along the length of the second member. The innermost vessel includes a bottom surface, and a continuous sidewall extending from a periphery of the bottom surface. The base of the rack is a peripheral frame that corresponds to the periphery of the innermost vessel. The peripheral frame is on the bottom surface of the innermost vessel, the peripheral frame and the periphery of the innermost vessel are juxtaposed, and the peripheral frame encircles a majority of the bottom surface of the innermost vessel that is unobstructed by the rack and available for supporting food thereon for cooking.

BRIEF DESCRIPTION OF THE DRAWINGS

Referring to the drawings.

DETAILED DESCRIPTION

Figure 1:
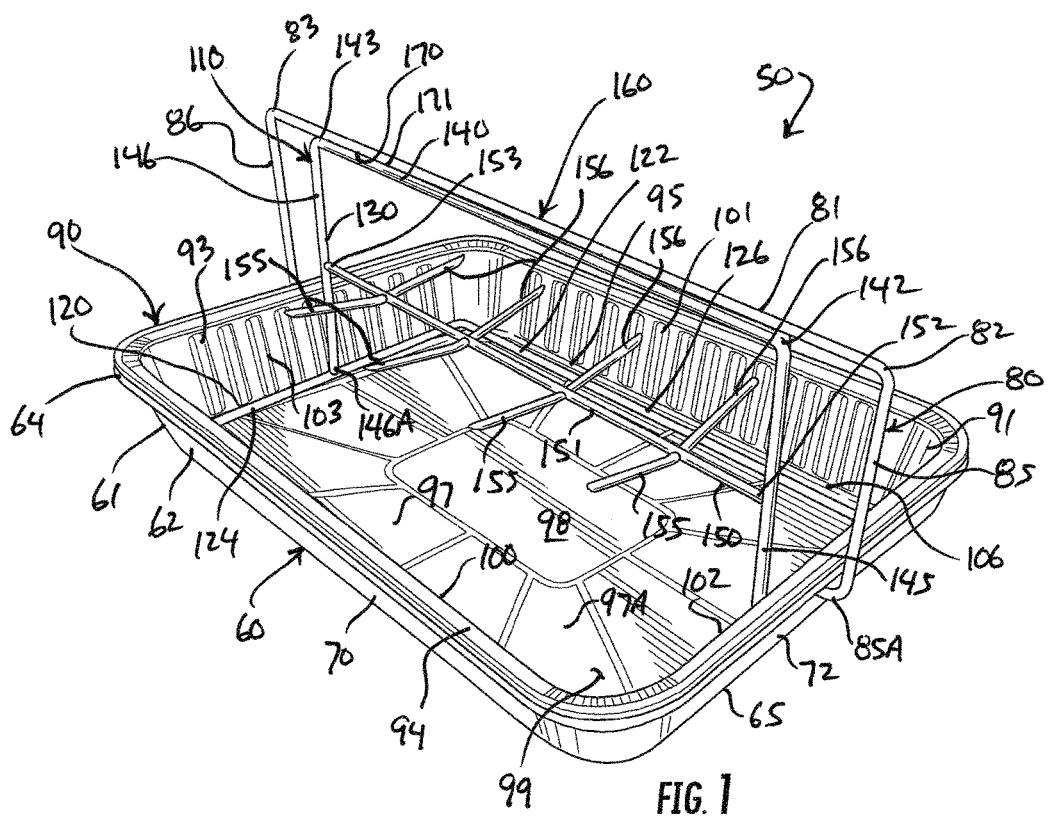
FIG. 1 is a perspective view of a cookware assembly including an outermost vessel, a handle mounted rotatably to the outermost vessel and shown as it would appear rotated to a raised or closed position relative to the outermost vessel, an innermost vessel nested in the outermost vessel, a rack including a base positioned removably on the innermost vessel and a frame, that projects from the base, including a handle above the innermost and outermost vessels and a food-supporting framework between base and the handle of the rack, the handle of the outermost vessel is coupled between the outermost vessel and the handle of the rack in the raised or closed position of the handle of the outermost vessel relative to the rack and the innermost and innermost vessels disabling the outermost vessel, the innermost vessel, and the rack from being separated from one another, and the handle of the outermost vessel and the handle of the rack form an assembled handle above the innermost and outermost vessels.

Turning now to the drawings, in which like reference characters indicate corresponding elements throughout the several views, attention is first directed to FIG. 1, in which there is seen a cookware assembly 50 including vessels 60 and 90, and rack 110. Cookware assembly 50 is an assemblage of vessels 60 and 90, and rack 110. Vessel 90 positioned removably on vessel 60 by being nested removably in vessel 60, whereby vessels 60 and 90 are nested together removably, vessel 60 is considered an outermost vessel, and vessel 90 is considered an innermost vessel. Rack 110 is capable of supporting food thereon for cooking and is positioned removably on vessel 90. A handle 80 couples vessel 60 to rack 110 clamping vessels 60 and 90 and rack 110 together disabling vessels 60 and 90 and rack 110 from being separated from one another.

In use, food to be cooked is placed on rack 110, and in vessel 90 if desired, and the entire cookware assembly 50 and the food to be cooked placed thereon is placed in an oven at a predetermined temperature and left there to cook until the food is cooked to the selected doneness. Vessel 90 under rack 110 collects any drippings from the food placed thereon as the food cooks. After the food is cooked to the selected doneness, cookware assembly 50 and the cooked food thereon can be removed from the oven. The cooked food can then be removed from rack 110, and from within vessel 90 if applicable, and subsequently consumed. When moved to and from the oven, rack 110 holding the food is disabled from sliding across vessel 90 and from falling out of vessel 90. Cookware assembly 50 may also be placed on a grill or other heat source for cooking food placed thereon.

A. The Outermost Vessel

Referring to FIGS. 2-5 in relevant part, vessel 60, a container, includes continuous sidewall 61 having outer surface 62, inner surface 63, upper edge 64, and lower edge 65. Horizontal bottom 67 is affixed to lower edge 65. Bottom 67 cooperates with inner surface 63 of continuous sidewall 61 to form volume 68, which is fluid impervious. Upper edge 64 encircles opening 69 to volume 68. Volume 68 is for receiving contents placed therein onto bottom 67 through opening 69. Continuous sidewall 61 is low and slanted and includes opposite side walls 70 and 71 that extend between opposite end walls 72 and 73. Side walls 70 and 71 are equal in length, and are longer than end walls 72 and 73, which are equal in length. Vessel 60 is rectangular in shape in this example, in which side walls 70 and 71 are perpendicular relative to end walls 72 and 73, and the length of vessel 60 from end wall 72 to end wall 73 is greater than the width of vessel 60 from side wall 70 to side wall 71. Vessel 90 is generally representative of a non-disposable, reusable, rimmed roasting pan, more specifically a flared roasting pan, a piece of cookware used for roasting food, such as meat and/or vegetables, in an oven, that is fashioned of, for example, copper, stainless steel, aluminum, aluminum alloy, a selected combination of selected metals and/or metal alloys commonly used roasting pan constructions, cast iron, or enamelware, as is customary in the art.

Vessel 60 corporates handle 80. Handle 80 is useful for taking up by hand or with an implement for moving and carrying vessel 60. Handle 80 is fashioned of aluminum, steel, stainless steel, or the like, and includes elongate member 81 having opposed ends 82 and 83, and arms 85 and 86. Elongate member 81 is longitudinally straight, and has a length from end 82 to end 83. Elongate member 81 extends along the length of vessel 60 from end 82 just beyond end wall 72 to end 83 just beyond end wall 73. Opposed, parallel arms 85 and 86, are equal in length, are each longitudinally straight and considerably shorter compared to the length of elongate member 81, and extend from the respective ends 82 and 83 perpendicularly relative to elongate member 81 to outer ends 85A and 86A rotated centrally to end walls 72 and 73, respectively, proximate to upper edge 64. Outer ends 85A and 86A are in-turned toward outer surface 62 are mounted rotatably to vessel 60, being applied to corresponding openings 87 and 88 formed in the respective end walls 72 and 73 proximate to upper edge 74, which secures handle 80 to vessel 60 and enables handle 80 to rotate from its lowered or open position in FIG. 2 to its raised or closed position in FIG. 5. In this example, handle 80 is fashioned of elongate bar stock of metal, which is bent or otherwise formed to shape.

Figure 2:
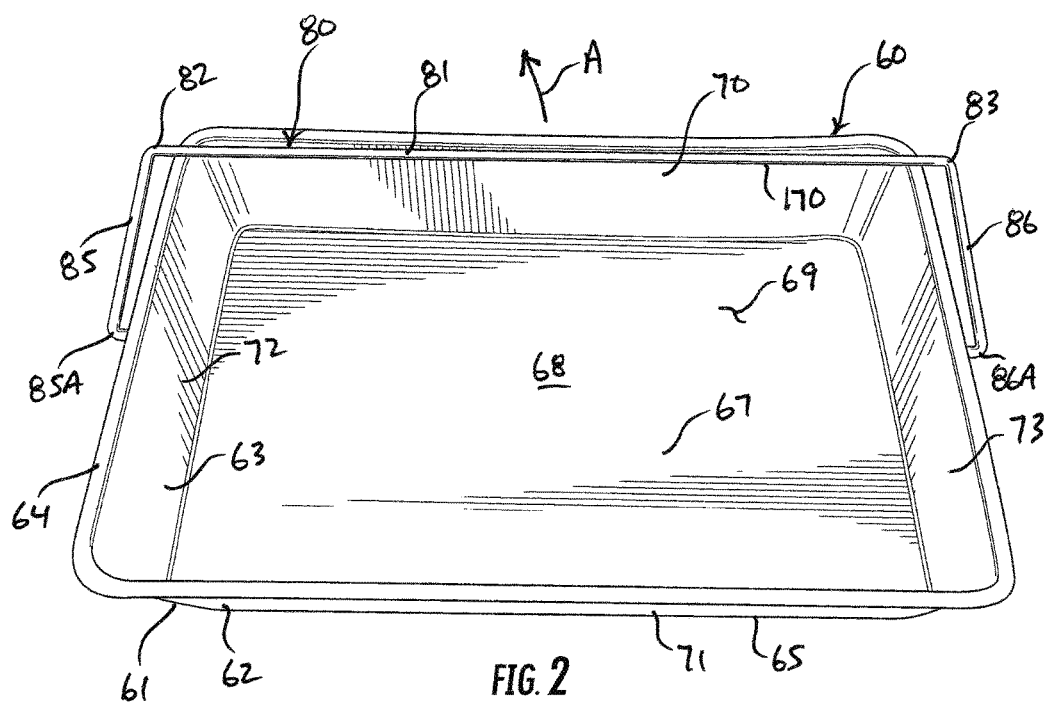
FIG. 2 is a perspective view of the outermost vessel of FIG. 1 illustrating the handle as it would appear in a lowered or open position relative to the outermost vessel.
Figure 3:
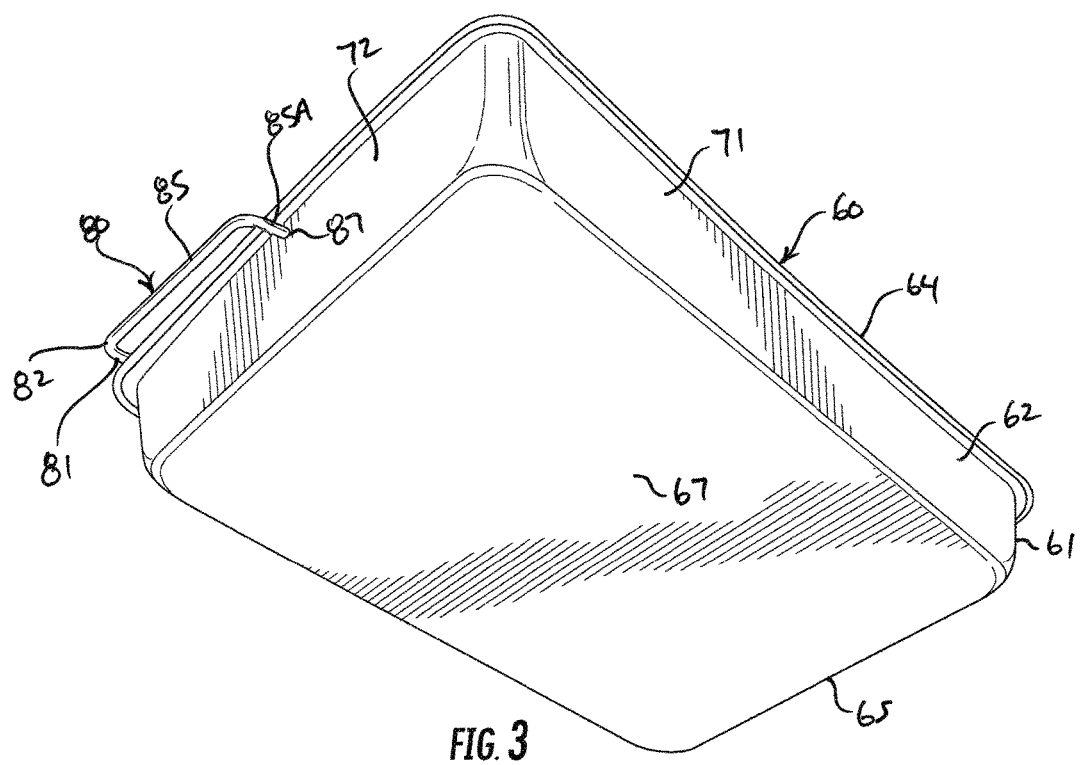
FIGS. 3 and 4 are opposite bottom perspective views, respectively, of the embodiment of FIG. 2.
Figure 4:
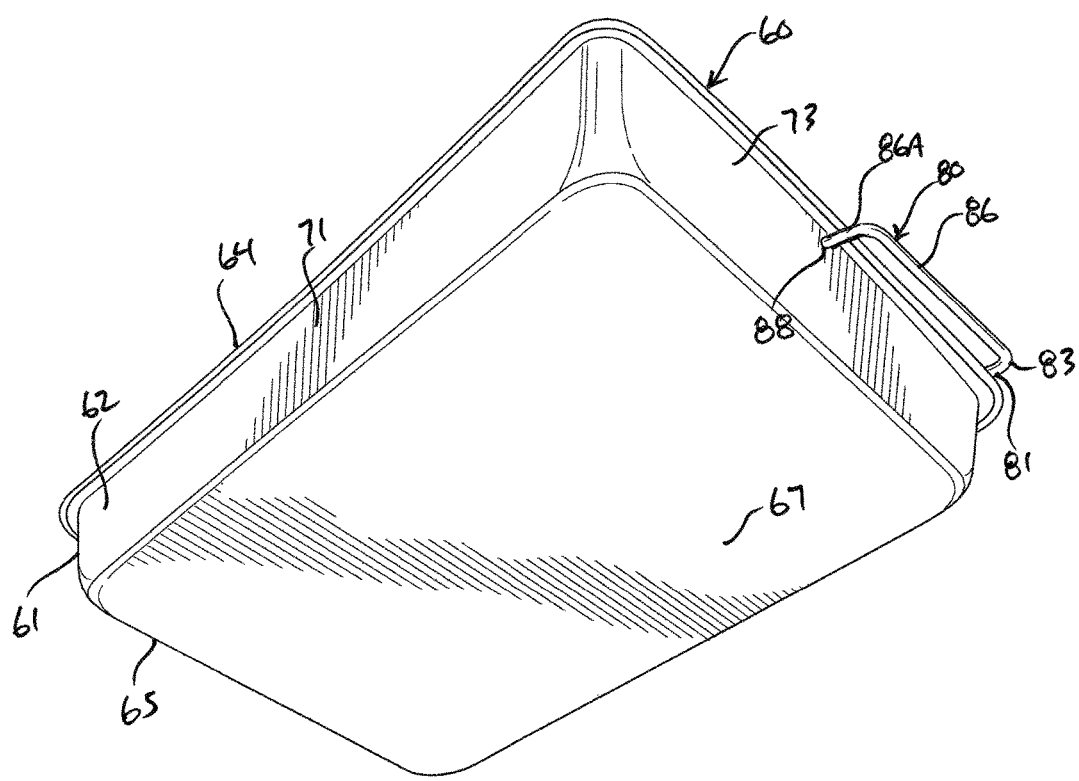
Figure 5:
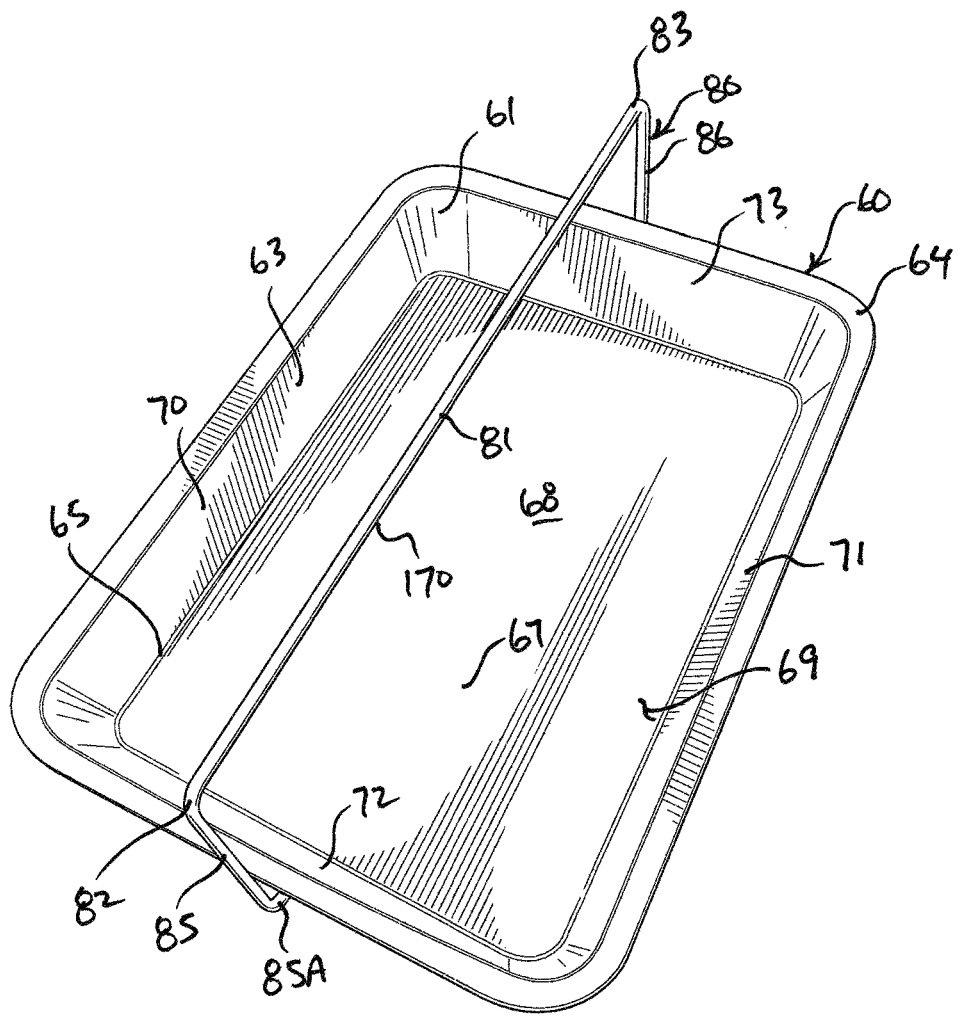
FIG. 5 is a perspective view of the outermost vessel of FIG. 2 showing the handle as it would rotated into its open position relative to the outermost vessel.

Arms 85 and 85 are juxtaposed outboard of, and are generally parallel to, upper edge 64 of the respective end walls 72 and 73 and extend toward side wall 70 from ends 85A and 86A, respectively, centrally at the respective end walls 72 and 73 to elongate member 81 proximate to side wall 70, which rests on upper edge 64 of the respective end walls 72 and 73 proximate to upper edge 64 of side wall 70, and is juxtaposed just inboard of, and is parallel to, upper edge 64 of side wall 70 so as to be out of the way of opening 69 to enable contents to be placed into volume 68 onto bottom 67 through opening 69 without interference from handle 80, when handle 80 is rotated into its lowered or open position in FIG. 2. Handle 80 can be rotated upwardly, such as by hand, in the direction of arrowed line A in FIG. 2 to its raised or closed position in FIG. 5. Arms 85 and 85 extend vertically upright from upper edge 64 of the respective end walls 72 and 73 to elongate member 81 over opening 69 and which extends centrally over vessel 60 from end wall 72 to end wall 73 between side walls 70 and 71 so as to be available for taking up by hand or with an implement for suspendingly carrying and moving vessel 60. Although FIG. 2 illustrates handle 80 as it would appear rotated to its lowered or open position toward side wall 70, handle 80 can be identically rotated to a lowered or open position toward side wall 71.

B. The Innermost Vessel

Figure 6:
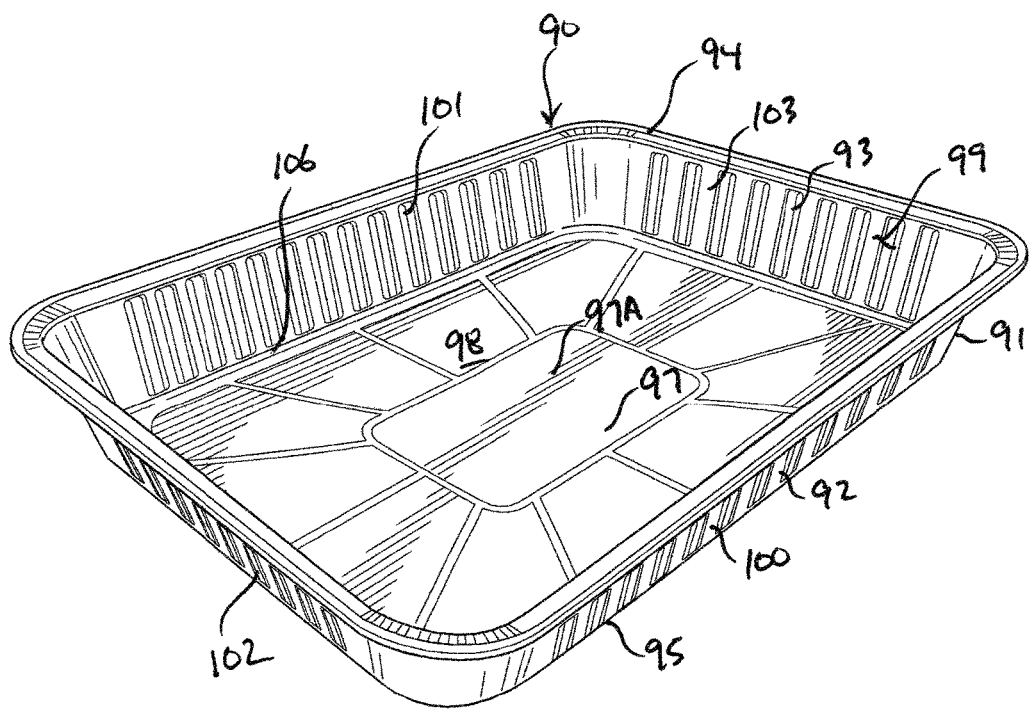
FIG. 6 is a perspective view of the innermost vessel of FIG. 1.

Referring to FIG. 6, vessel 90, a container, includes continuous sidewall 91 having outer surface 92, inner surface 93, upper edge 94, and lower edge 95. Horizontal bottom 97 is affixed to lower edge 95. Bottom 97 cooperates with inner surface 93 of continuous sidewall 91 to form volume 98, which is fluid impervious. Upper edge 94 encircles opening 99 to volume 98. Volume 98 is for receiving contents placed therein onto bottom 97 through opening 99. Continuous sidewall 91 is low and slanted and includes opposite side walls 100 and 101 that extend between opposite end walls 102 and 103. Side walls 100 and 101 are equal in length, and are longer than end walls 102 and 103, which are equal in length. Bottom 97 defines a bottom surface 97A. Continuous sidewall 91 extends from a periphery 106 of bottom surface 95 to upper edge 94. Vessel 90 is rectangular in shape in this example, as is periphery 106, in which side walls 100 and 101 are perpendicular relative to end walls 102 and 103 and the length of vessel 90 from end wall 102 to end wall 103 is greater than the width of vessel 90 from side wall 100 to side wall 102. Vessel 90 is fashioned of aluminum foil, and is generally representative of an inexpensive, rimmed roasting pan, more specifically a flared roasting pan, a piece of cookware used for roasting food, such as meat and/or vegetables, in an oven, and that is disposable after one use. After a single use of vessel 90, it is not designed or intended to be reused, but is rather designed to be thrown away.

C. The Rack

Figure 7:
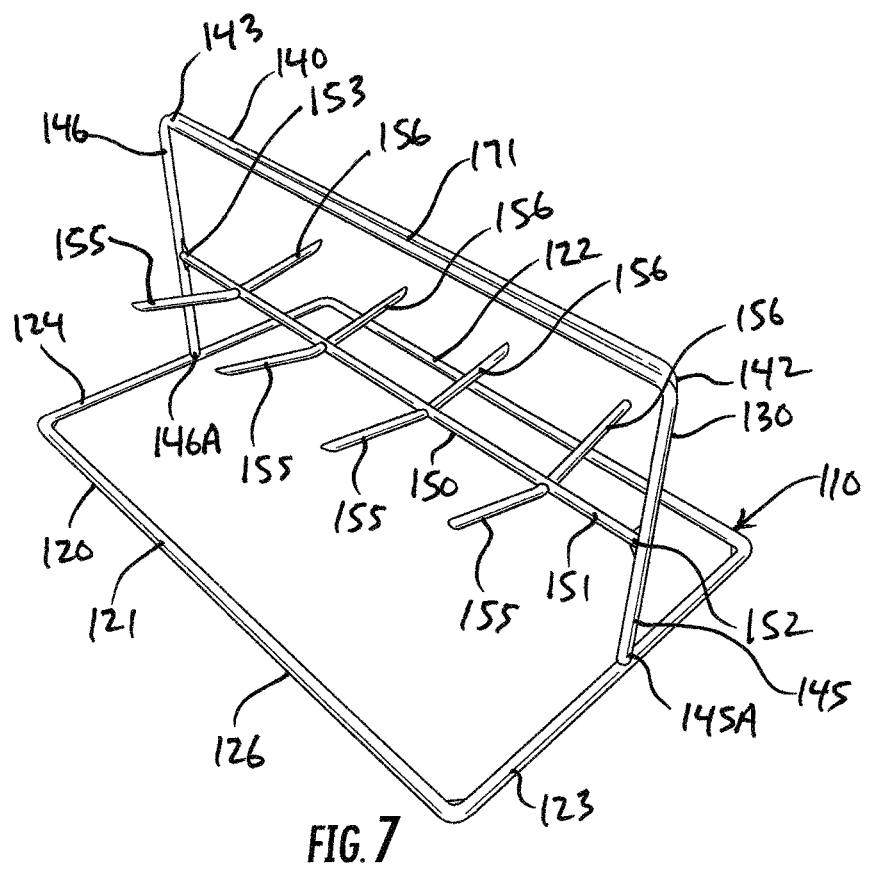
FIGS. 7 and 8 are end and side perspective views, respectively, of the rack of FIG. 1.
Figure 8:
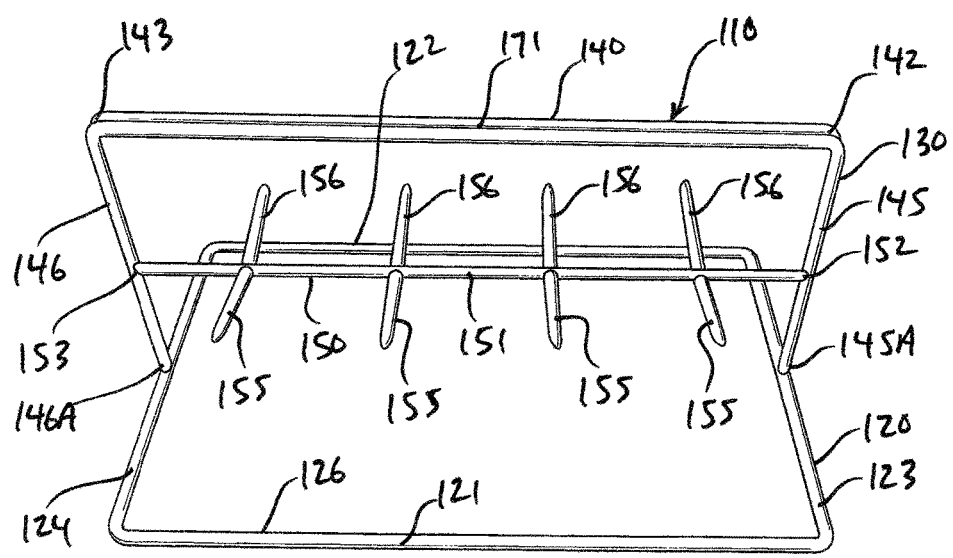

Referring to FIGS. 7 and 8, rack 110 is constructed of elongate bar stock of metal, such as steel, stainless steel, aluminum, or the like which may be furnished with a non-stick finish for easier and faster cleanup. Rack 110 includes base 120 and frame 130.

Base 120 is a peripheral frame 126 that includes opposed, parallel side members 121 and 122 that extend between opposed, parallel end members 123 and 124. Side members 121 and 122 are perpendicular relative to end members 123 and 124. Side members 121 and 122 are equal in length, end members 123 and 124 are equal in length, and side members 121 and 122 are longer than end members 123 and 124. Peripheral frame 126 is rectangular in shape in this example, in which the length of peripheral frame 126 from end member 123 to end member 124 is greater than the width of peripheral frame 126 from side member 121 to side member 122. The size and shape of peripheral frame 126 corresponds to the size and shape of periphery 106 of vessel 90.

Frame 130 projects upright vertically from base 120, and includes handle 140 and framework 150 between handle 140 and base 120. Handle 140, framework 150, and base 120 are parallel relative to each other. Frame 130 is affixed rigidly to end members 123 and 124, and is centered between side members 121 and 122.

Handle 140 is an elongate member and has opposed ends 142 and 143. Handle 140 is longitudinally straight, and has a length from end 142 to end 143. The length of handle 140 from end 142 to end 143 is equal in to the length of peripheral frame 126 from end member 123 to end member 124.

Handle 140 is connected to base 120 with arms 85 and 86, and framework 150 is affixed rigidly to arms 85 and 86. Opposed, parallel arms 145 and 146 are equal in length, are each longitudinally straight and considerably shorter compared to the length of handle 140, and extend downward vertically from the respective ends 142 and 143 perpendicularly relative to handle 140 to ends 145A and 146A affixed rigidly via welding and centrally to the respective end members 123 and 124. Arms 145 and 146 connect handle 140 to base 120 and, more specifically, to the respective end members 123 and 124 of peripheral frame 126. Handle 140 is useful for taking up by hand or with an implement for suspendingly carrying and moving rack 110.

Framework 150 is a food-supporting framework which is coupled to arms 145 and 146 and is between handle 140 and base 120. Framework 150 includes elongate member 151, which is longitudinally straight from end 152, affixed rigidly arm 145 centrally between handle 140 and end member 123 of base 120 via welding, to end 153, affixed rigidly to arm 146 centrally between handle 140 and end member 124 of base 120 via welding. Elongate member 151 is parallel relative to handle 140 and base 120. Elongate member 151 is carried by arms 145 and 146 and, in turn, carries skewers 155 and skewers 156.

Skewers 155 and skewers 156 are each an elongate pin for inserting through meat or other food to hold or bind it in cooking. Skewers 155 and skewers 156 are identical. Skewers 155 are between arms 145 and 146, are equally spaced apart, are parallel relative to each other, extend outwardly toward side member 121, and are slanted slightly upwardly away from base 120. Skewers 156 are between arms 145 and 146, are equally spaced apart, are parallel relative to each other, extend outwardly toward side member 122, and are slanted slightly upwardly away from base 120. Skewers 155 are each diametrically opposed to one of skewers 156, thereby forming spaced-apart pairs of skewers, in which each skewer 155 is a mirror image of a corresponding one of skewers 156. In this example, there are four skewers 155 and four skewers 156, forming four pairs of skewers which are equally spaced apart along the length of elongate member 151 from arm 145 to arm 146. Less or more than four skewers 155 and less or more than four skewers 156 can be provided without departing from the invention. Preferably, skewers 155 are equal in number to skewers 156 so as to form spaced-apart pairs of skewers.

D. The Cookware Assembly

Cookware assembly 50 in FIG. 1 is an assemblage of vessel 60, vessel 90, and rack 110. Vessels 60 and 90 are "like vessels" in that they are of like size and shape to enable them to be nested together removably, namely, to enable a removable nesting of vessel 90, the disposable vessel, within vessel 60, the non-disposable vessel.

Figure 10:
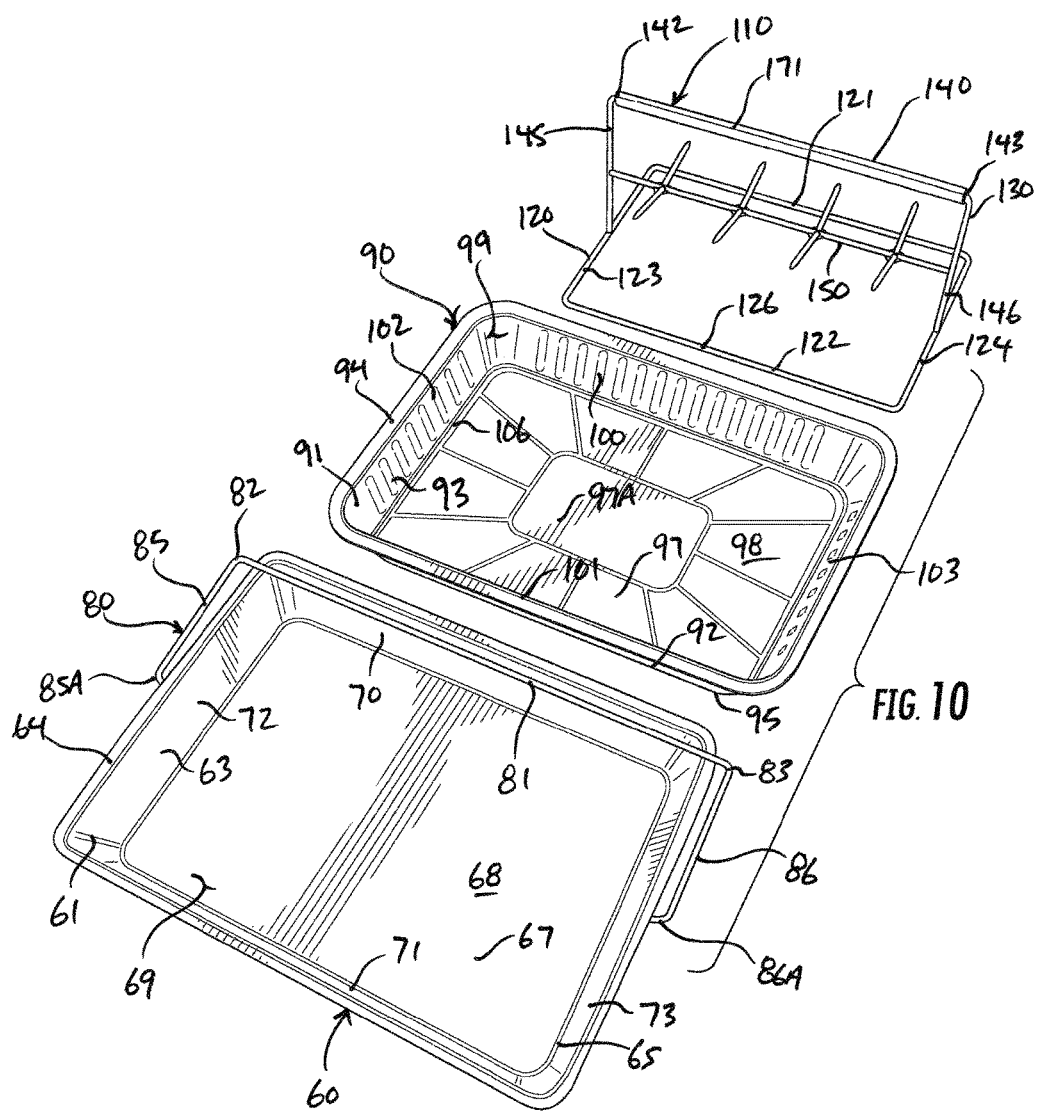
FIG. 10 is a perspective view of the outermost vessel, the innermost vessel, and the rack of FIG. 1 shown as they would appear separated in preparation for being assembled.
Figure 11:
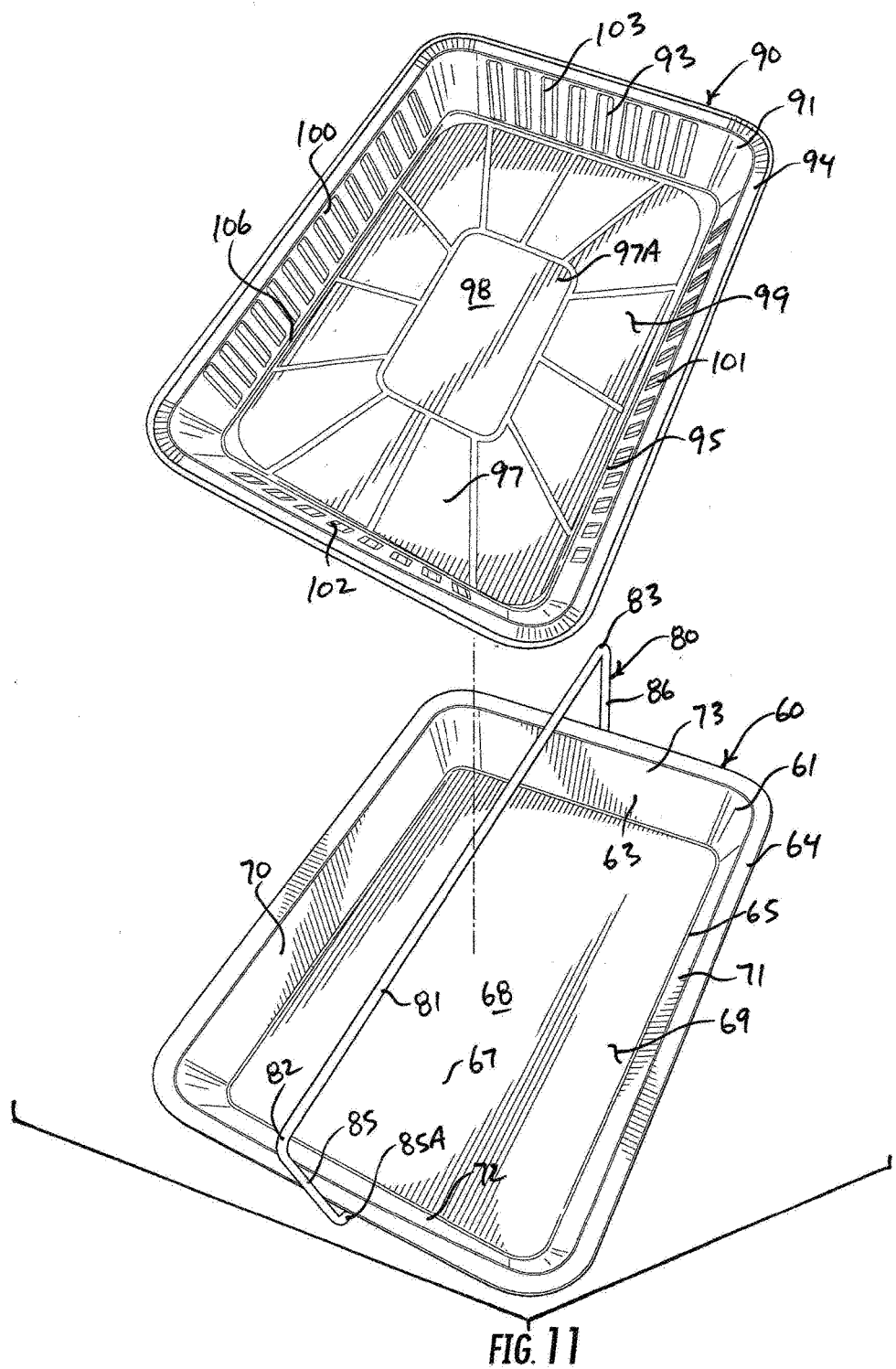
FIGS. 11-17 illustrate a sequence of steps of assembling the outermost vessel, the innermost vessel, and the rack into the cookware assembly of FIGS. 1 and 16.

Assembling vessel 60, vessel 90, and rack 110 begins in FIG. 10 with vessel 60, vessel 90, and rack 110 separated from one another with vessel 60 positioned upright from bottom to 67 to upper edge 64 with handle 80 in its closed position to enable vessel 90 to be nested in vessel 60, with vessel 90 positioned upright from bottom 97 to upper edge 94, and with rack 110 positioned upright from base 120 to base 120 that projects upright from base 120 to handle 140. In FIG. 11, vessels 60 and 90 are oriented upright, handle 80 of vessel 60 is rotated to its raised or closed position, and vessel 90 is above vessel 90 and is registered with vessel 60, in which bottom 97 of vessel 90 is registered with opening 69, volume 68, and bottom 67 of vessel 60, side wall 100 of vessel 90 is registered with side wall 70 of vessel 60, side wall 101 of vessel 90 is registered with side wall 71 of vessel 60, end wall 102 of vessel 90 is registered with end wall 72 of vessel 60, and end wall 103 of vessel 90 is registered with end wall 73 of vessel 60. Vessel 90 is moved downwardly to one side of handle 80, then laterally inward between handle 80 and opening 69, namely, between elongate member 81 and opening 99 to vessel 90 volume 98 and between arms 85 and 86, so as to register vessel 90 with volume 68 of vessel 60, and is then moved downwardly in the direction of vessel 60 so as to apply vessel 90 bottom 97 first into volume 68 through opening 69 until vessel 90 is applied within volume 68 and comes to rest on vessel 60 thereby removably nesting vessel 90 within vessel 60 in FIG. 12, in which vessel 90 is fit within vessel 60 and positioned removably on vessel 90. Upper edge 94 of vessel 90 rests atop upper edge 64 of vessel 60, bottom 97 of vessel 90 and bottom 67 of vessel 60 are juxtaposed, side wall 100 of vessel 90 and side wall 70 of vessel 60 are juxtaposed, side wall 101 of vessel 90 and side wall 71 of vessel 60 are juxtaposed, end wall 102 of vessel 90 and end wall 72 of vessel 60 are juxtaposed, and end wall 103 of vessel 90 and end wall 73 of vessel 60 are juxtaposed, when vessels 60 and 90 are nested removably together. Vessel 90 can be un-nested from vessel 60 by reversing the described nesting procedure.

Figure 12:
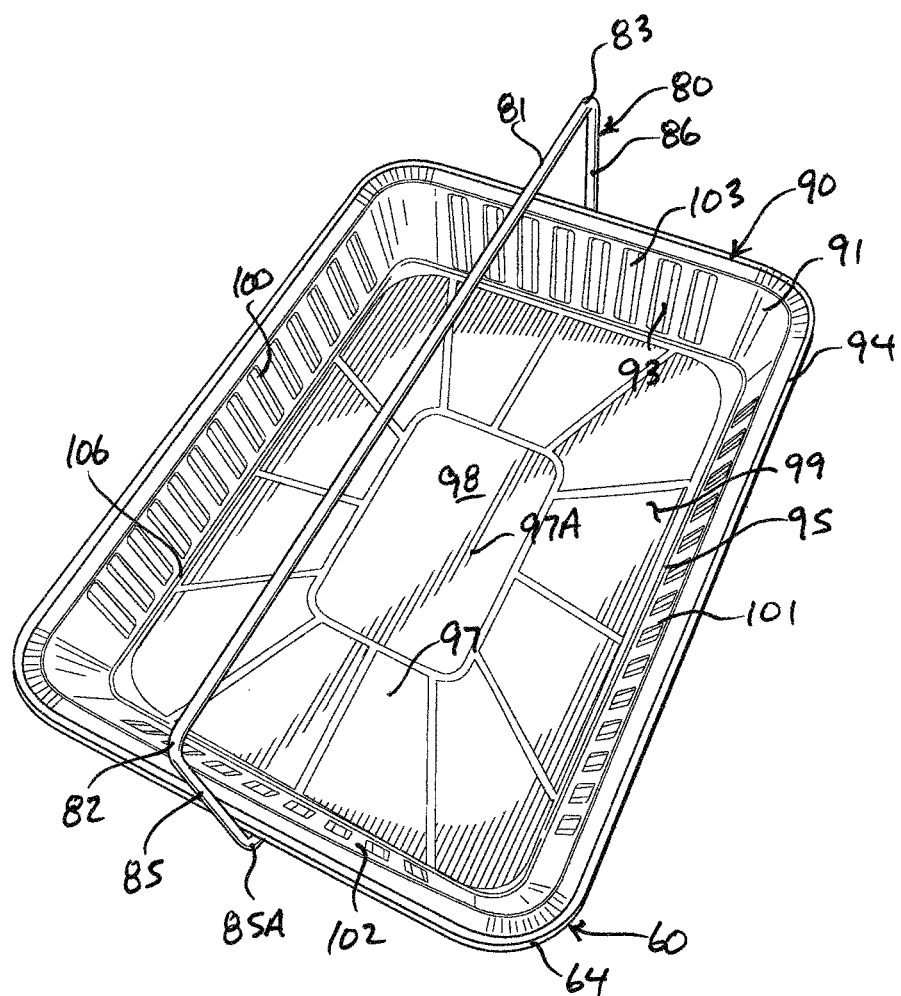
Figure 13:
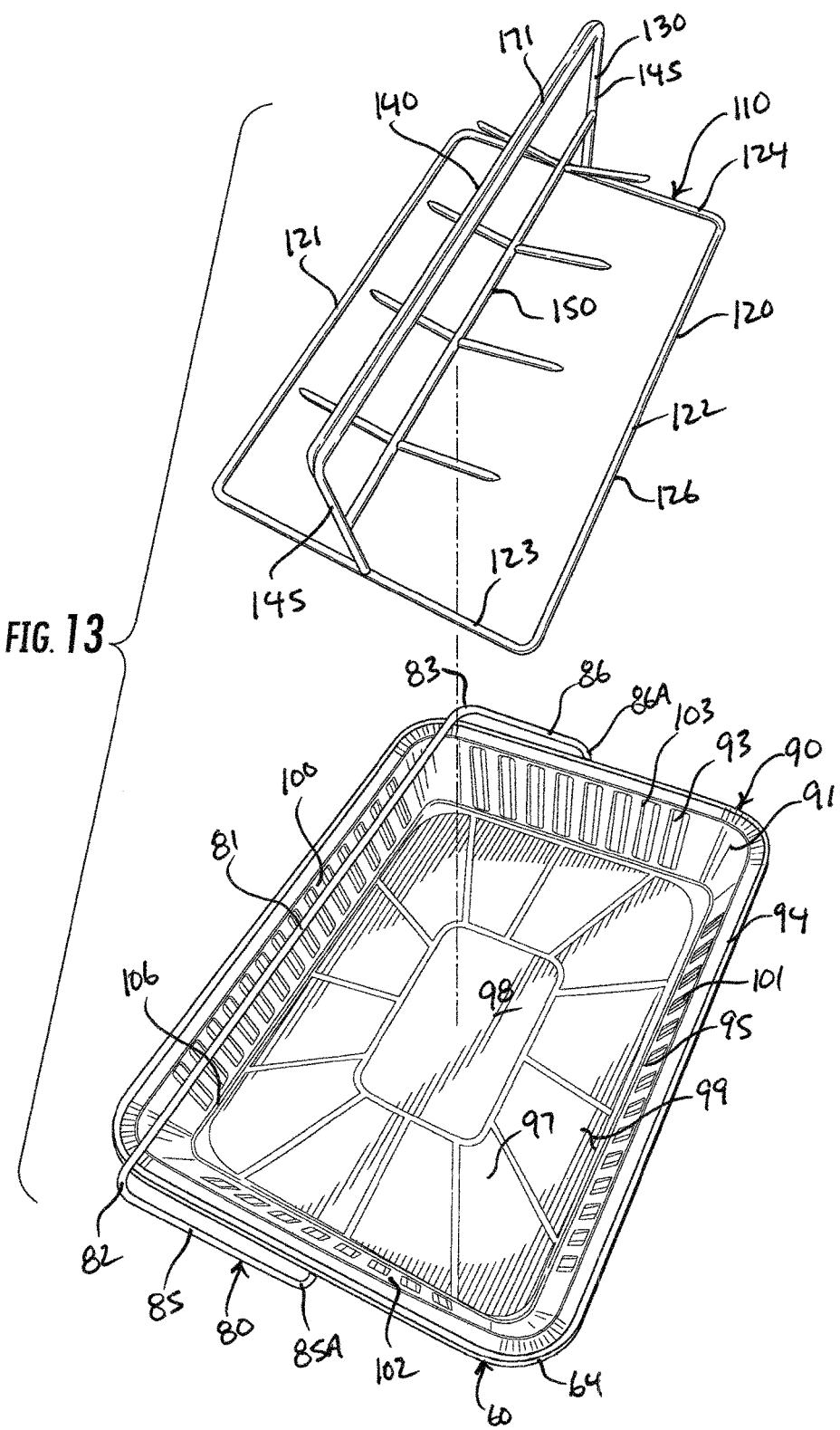

Handle 80 is then moved downwardly from its raised or closed position in FIG. 12 to its lowered or open position in FIG. 13 out of the way of opening 99 to volume 98 of vessel 90. Arms 85 and 85 are juxtaposed outboard of, and are generally parallel to, upper edge 64 of the respective end walls 72 and 73 of vessel 60 and upper edge 94 of the respective end walls 102 and 103 of vessel 90 and extend toward side wall 70 of vessel 60 and side wall 100 of vessel 90 from ends 85A and 86A, respectively, centrally at the respective end walls 72 and 73 to elongate member 81 proximate to side walls 70 and 100, which rests on upper edge 94 of the respective end walls 102 and 103 proximate to upper edge 94 of side wall 100, and is juxtaposed just inboard of, and is parallel to, upper edge 94 of side wall 100 so as to be out of the way of opening 99 to enable contents to be placed into volume 98 onto bottom 97 through opening 99 without interference from handle 80, when vessels 60 and 90 are nested and when handle 80 is in its lowered or open position in FIG. 13.

Having removably assembled vessels 60 and 90 in FIG. 13, rack 110 is positioned upright above vessel 90, peripheral frame 126 is registered with periphery 106 of vessel 90, in which side member 121 of peripheral frame 126 is registered with the length of periphery 106 along side wall 100, side member 122 of peripheral frame 126 is registered with the length of periphery 106 along side wall 101, end member 123 of peripheral frame 126 is registered with the length of periphery 106 along end wall 102, and end member 124 of peripheral frame 126 is registered with the length of periphery 106 along end wall 103, and arms 145 and 146 are registered with the respective ends 85A and 86A of handle 80 along a vertical plane. Rack 110 is then moved downwardly in the direction of vessel 90 so as to apply rack 110 base 120 first into volume 98 through opening 99 until base 120 comes to rest directly against bottom surface 97A of bottom 97 in FIG. 14 in which peripheral frame 126 is on bottom surface 97A of bottom 97 of vessel 90 and peripheral frame 126 and periphery 106 are juxtaposed, whereby side member 121 of peripheral frame 126 and the length of periphery 106 along side wall 100 are juxtaposed in which side member 121 extends along the length of periphery 106 along side wall 100, side member 122 of peripheral frame 126 and the length of periphery 106 along side wall 101 are juxtaposed in which side member 122 extends along the length of periphery 106 along side wall 101, end member 123 of peripheral frame 126 and the length of periphery 106 along end wall 102 are juxtaposed in which end member 123 extends along the length of periphery 106 along end wall 102, and end member 124 of peripheral frame 126 and the length of periphery 106 along end wall 103 are juxtaposed in which end member 124 extends along the length of periphery 106 along end wall 103, and arms 145 and 146 and handle 140 of frame 130 are registered along a vertical plane with the respective ends 85A and 86A of handle 80 mounted rotatably to the respective end walls 72 and 73 of vessel 60.

Figure 14:
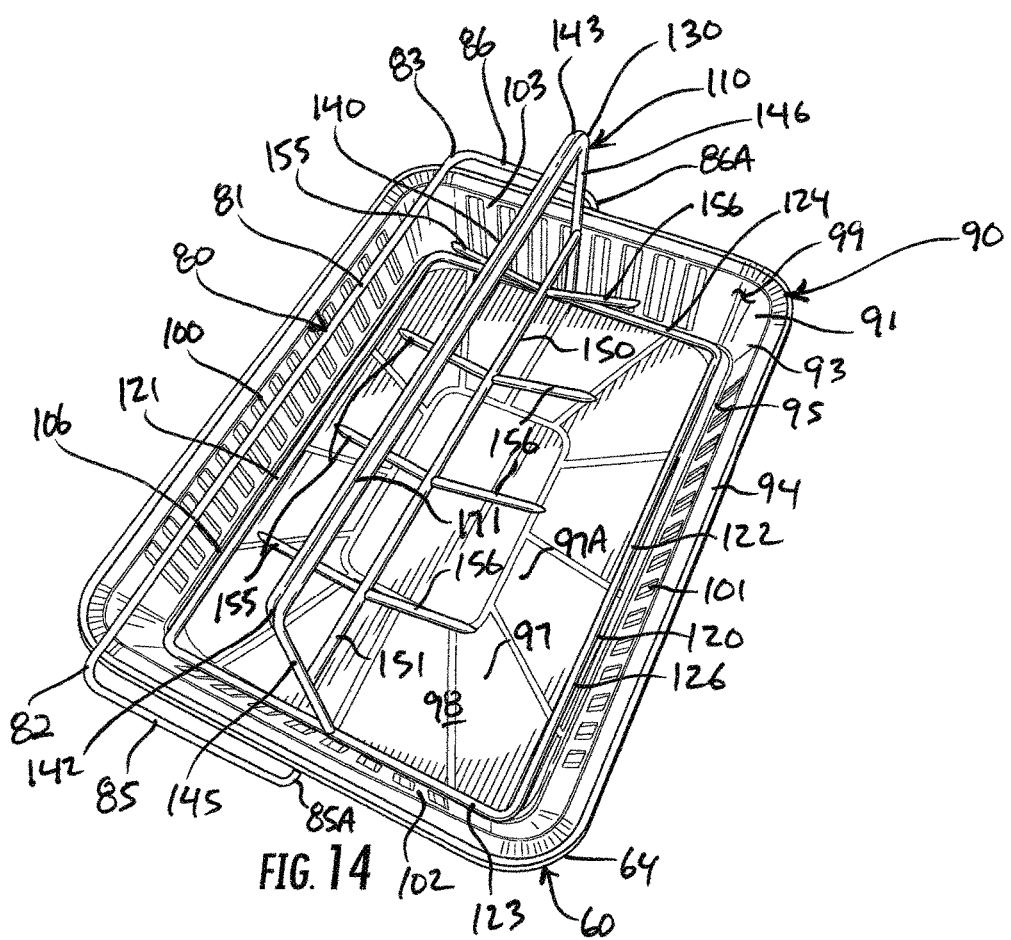

In FIG. 14, vessel 90 is positioned removably on, i.e. is nested within, vessel 60, base 120 is positioned removably on bottom surface 97A of bottom 97 of vessel 90, frame 130 projects upright from base 120 to handle 140 above vessels 60 and 90, and food-supporting framework 150 is between base 120 and handle 140 and, moreover, is between bottom surface 97A of bottom 97 and handle 140. Frame 130 extends vertically upright from base 120 to handle 140 which extends along the length of vessel 90 from arm 145 proximate to end wall 102 to arm 146 proximate to end wall 103, and is centered between side walls 100 and 101 of vessel 90. Frame 150 of rack 110 extends between from arm 145 to arm 146 and is centered between side walls 100 and 101. Ends 85A and 86A of handle 80 mounted rotatably to the respective end walls 72 and 73 (not shown in FIG. 14 because they are concealed by vessel 90 nested in vessel 60) are aligned with the vertical plane along which frame 130 resides. Peripheral frame 126 corresponds to periphery 106 of vessel 90. Peripheral frame 126 is on bottom surface 97A of bottom 97 of vessel 90, peripheral frame 126 and periphery 106 are juxtaposed, in which side member 121 extends along the length of periphery 106 between bottom surface 97A and side wall 100, side member 122 extends along the length of periphery 106 between bottom surface 97A and side wall 101, end member 123 extends along the length of periphery 106 between bottom surface 97A and end wall 102, and end member 124 extends along the length of periphery 106 between bottom surface 97A and end wall 103, and peripheral frame 126 encircles a majority of bottom surface 97A of bottom 97 of vessel 90 that is unobstructed by rack 110 and thereby available for supporting food thereon for cooking.

Figure 15:
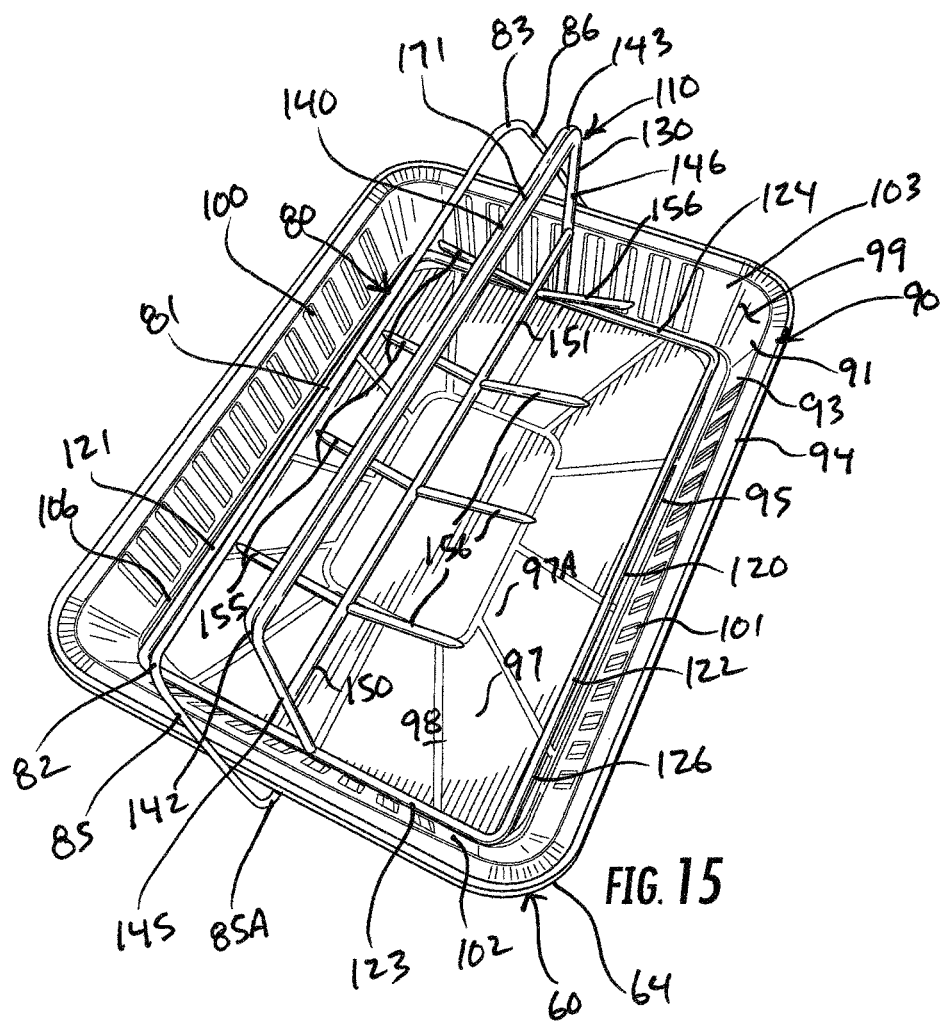

Vessel 60, vessel 90, and rack 110 are separable from one another by reversing the above initial assembly operation, when handle 80 is in its open position in FIG. 14 detached from rack 110 in FIG. 14. To secure together the initially assembled vessel 60, vessel 90, and rack 110, handle 80 is rotated, such as by hand, from its lowered or open position in FIG. 14 relative to vessel 60, vessel 90, and rack 110, to its raised or closed position in FIGS. 16, 17, and 1 relative to vessel 60, vessel 90, and rack 110. FIG. 15 illustrates handle 80 as it would appear rotated to an intermediate position between its lowered or open position in FIG. 14 to its raised or closed position in FIGS. 16, 17, and 1. Vessel 60, vessel 90, and rack 110 are inseparable, and handles 80 and 140 form an assembled handle 160 above vessels 60 and 90, when vessels 60 and 90 and rack 110 are assembled and handle 80 is in its raised or closed position attached to rack 110 in FIGS. 16, 17, and 1. Assembled handle 160 is useful for taking up by hand or with an implement for suspendingly carrying and moving cookware assembly 50.

Handle 80 and frame 130 reside along a common vertical plane and handle 140 is attached elongate member 81 of handle 80, when vessel 90 is nested within, i.e. positioned removably on, vessel 60 and when rack 110 is positioned removably on vessel 90, as described above in the assemblage of vessels 60 and 90 and rack 110. Arms 85 and 85 extend vertically upright from vessel 60 and from upper edge 94 of the respective end walls 72 and 73 of vessel 90 to elongate member 81 over opening 99 and which extends centrally over elongate member 81 of handle and over vessel 90 from end wall 102 to end wall 103. The height of handle 80 in its raised or closed position and the height of handle 140 of rack 110 when vessel 90 is nested within vessel 60 and when rack 110 is positioned removably on vessel 90 is chosen such that elongate member 81 of handle 80 forcibly engages the top side of handle 140 so as to form assembled handle 160 and forcibly clamp vessel 90 and rack 110 by and between handle 80 and vessel 60, which secures vessels 60 and 90 and rack 110 together and disables vessels 60 and 90 from being separated from one another so as to form cookware assembly 50, according to the principle of the invention. In this clamped configuration, vessel 90 and rack 110 are clamped by and between handle 80 and vessel 60, and vessels 60 and 90 and rack 110 are inseparable, forming cookware assembly 50, namely, a clamped assemblage of vessels 60 and 90 and rack 110.

Figure 9:
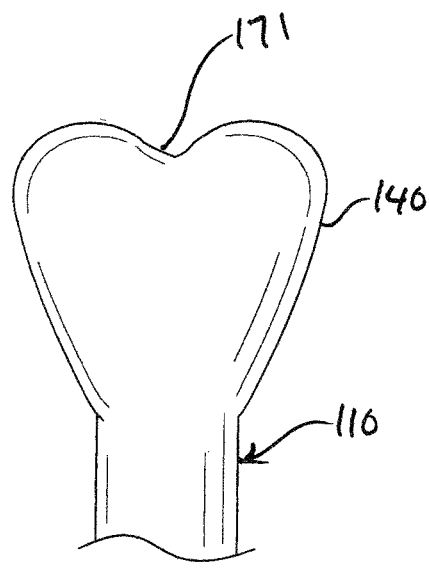
FIG. 9 is an enlarged, fragmented end elevation view of the handle of the rack illustrating a strike component formed in the handle of the rack.

A detent assembly is used to retain elongate member 81 of handle 80 to handle 140 of rack 110 when handle 80 is in its closed position and when vessel 90 is nested within vessel 60 and when rack is positioned removably on vessel 90. The detent assembly includes a protuberant component 170 and a strike component 171. In this example protuberant component 170 is carried by elongate member 81 of handle 80, and strike component 171 is carried by handle 140. In FIGS. 1, 2, 5, and 10-16, protuberant component 171 is simply the undersurface of elongate member 81 that extends along the length of elongate member from end 82 to end 83. In FIGS. 1, 7-9, and 13-17, strike component 171 is a central recess formed in the top side of handle 140 that extends along the length of handle 140 from end 142 to end 143. FIG. 9 is an enlarged, fragmented end elevation view of elongate member 81 of handle 80 illustrating strike component 171 formed elongate member 81 of handle 80. The height of handle 80 in its raised or closed position and the height of handle 140 of rack 110 when vessels 60 and 90 are nested together removably and when rack 110 is positioned removably on vessel 90 is chosen such that protuberant component 170 of elongate member 81 of handle 80 snaps forcibly into and is retained by strike component 171 in the top side of handle 140 along the length of strike component 171 from end 142 to end 143 so as to retain handle 80 to handle 140 so as to form assembled handle 160 and forcibly clamp vessel 90 and rack 110 by and between vessel 60 and handle 80, which disables vessels 60 and 90 and rack 110 from being separated from one another so as to form cookware assembly 50. Again, vessels 60 and 90 and rack 110 are inseparable in this clamped configuration, forming cookware assembly 50. FIG. 18 is a section view taken along line 18-18 of 17 illustrating protuberant component 171 of elongate member 81 of handle 80 as it would appear retained in strike component 171 of handle 140.

Figure 19:
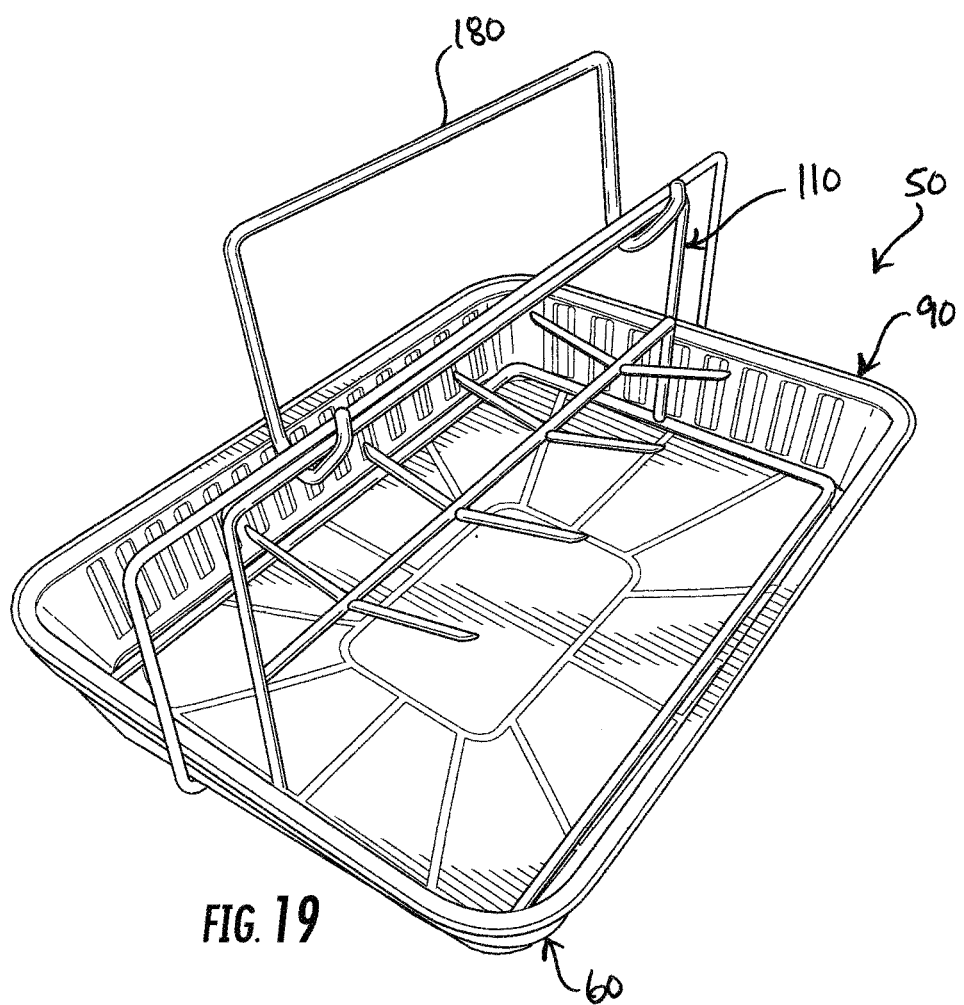
FIG. 19 is a perspective view of the embodiment of FIG. 1 illustrating an implement taking up the assembled handle.

In use, food to be cooked can be placed on rack 110, such as directly on framework 150 or by inserting one or more of skewers 155 and/or skewers 156 through the meat or other food to hold or bind it in cooking, and on bottom surface 97A of vessel 90 if desired, and the entire cookware assembly 50 and the food to be cooked placed thereon is placed in an oven at a predetermined temperature and left there to cook until the food is cooked to the selected doneness. Vessel 90 under rack 110 collects any drippings from the food placed thereon preventing the drippings from falling onto a direct heat source and flaming as the food cooks and shields vessel 60 from the drippings. Vessels 60 and 90 shield the food on rack 110 from exposure to direct heat from the bottom and from fat dripping from the food directly onto the heat source, especially if cookware assembly 50 is placed on an open grill, which enables food on rack 110 to cook slowly and more evenly and prevents flare-ups from fat dripping from the food directly onto the heat source. After the food is cooked to the selected doneness, cookware assembly 50 and the cooked food thereon can be removed from the oven. The cooked food can then be removed from rack 110, and from within vessel 90 if applicable, and subsequently consumed. Assembled handle 160 above vessels 60 and 90 can be taken up by hand or with an implement, such as implement 180 in FIG. 19, for suspending carrying and moving cookware assembly 50 as needed, including to and from the oven. Alternatively, vessels 60 and 90 can be taken up by hand or with an implement for lifting and moving cookware assembly 50. Because peripheral frame 126 relates to periphery 106 of vessel 90 and because vessel 90 and rack 110 are clamped by and between handle 80 and vessel 60, rack 110 holding the food is disabled from sliding across vessel 90 and from falling out of vessel 90, according to the principle of the invention. Cookware assembly 50 may also be placed on a grill or other heat source for cooking food placed thereon.

Figure 16:
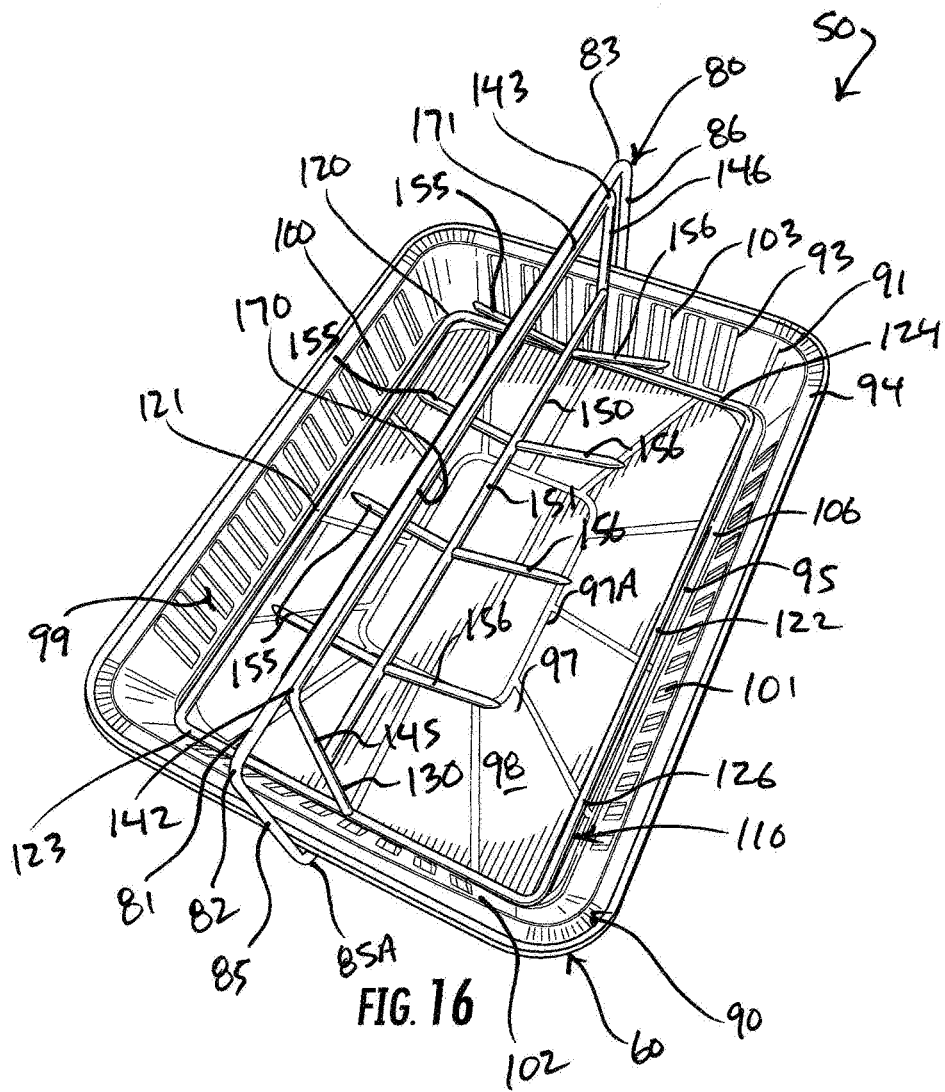
Figure 17:
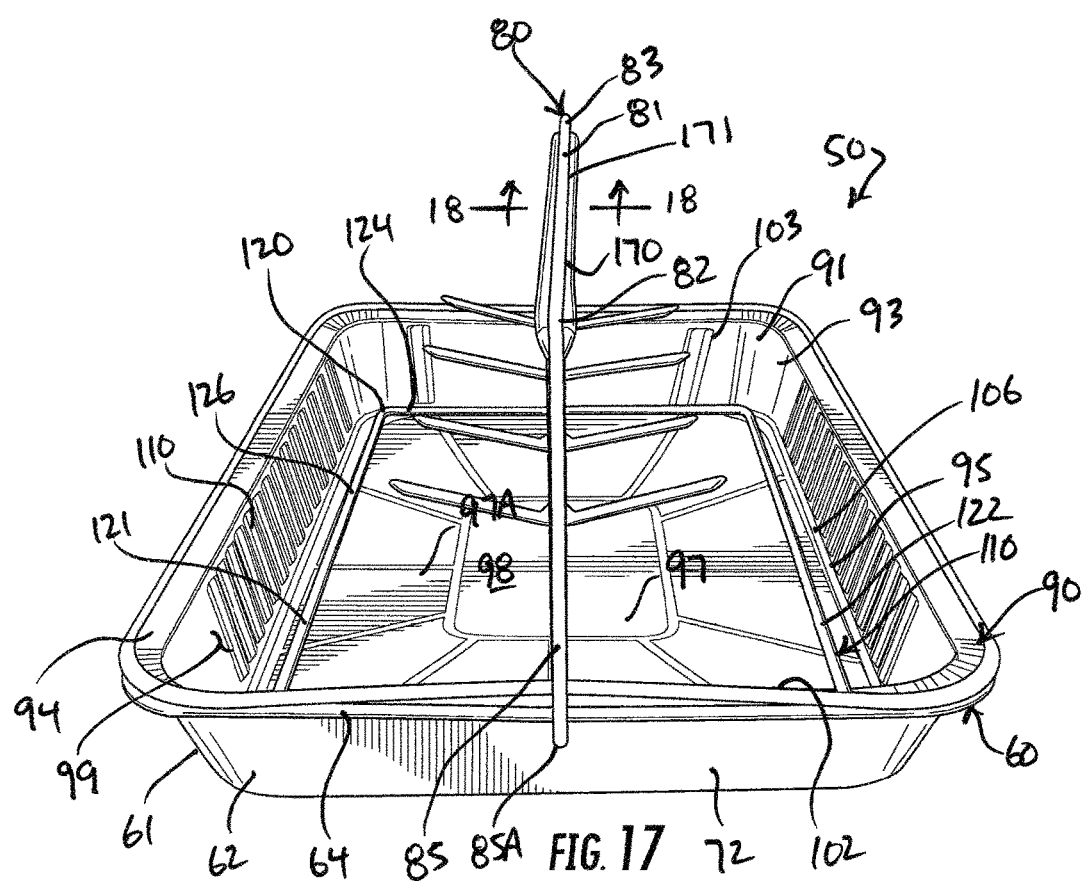
Figure 18:
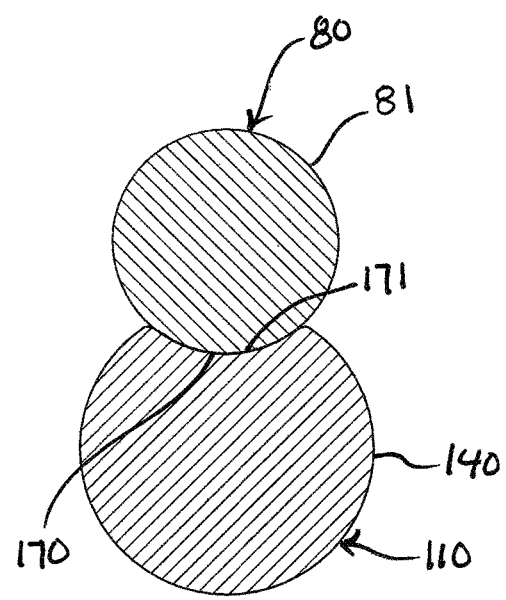
FIG. 18 is a section view taken along line 18-18 of FIG. 17.

After cooking, handle 80 is moved, such as forcibly by hand, out of its raised or closed position in FIGS. 16, 17, and 1 slipping protuberant component 170 out of strike component 171, and is rotated from its raised or closed position in FIGS. 16, 17, and 1 to its lowered or open position in FIG. 14, which enables rack 110 to be separated from vessel 90 and which enables vessel 90 to be separated from, i.e. un-nested from, vessel 60. Because, vessel 90 nested in vessel 60 shields vessel 60 from drippings, vessel 90 can be discarded after a single use and vessel 60 may be stored or, if desired, cleaned first and then stored. Rack 110, of course, can be stored after being suitably cleaned.

The present invention is described above with reference to illustrative embodiments. However, those skilled in the art will recognize that changes and modifications may be made in the described embodiment without departing from the nature and scope of the present invention. Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A cookware assembly, comprising:
    a first vessel;
    a second vessel positioned removably on the first vessel;
    a rack, capable of supporting food thereon for cooking, positioned removably on the second vessel;
    a handle mounted to the first vessel for movement between an open position detached from the rack and a closed position attached to the rack;
    the first vessel, the second vessel, and the rack are separable from one another, when the handle is in the open position; and
    the first vessel, the second vessel, and the rack are secured, when the handle is in the closed position.

2. The cookware assembly according to claim 1, further including a detent assembly for retaining the handle to the rack when the handle is in the closed position.

3. The cookware assembly according to claim 2, wherein the detent assembly includes a protuberant component and a strike component, one of the components is carried by the handle and the other of the components is carried by rack.

4. The cookware assembly according to claim 3, wherein the rack includes a base which is placed upon the second vessel and a frame, capable of supporting food thereon, that projects from base.

5. The cookware assembly according to claim 4, wherein the frame includes a handle above the first and second vessels for taking up the rack by hand or with an implement.

6. The cookware assembly according to claim 5, wherein the other of the components is carried by the handle of the frame, and the handle of the first vessel and the handle of the rack form an assembled handle above the first and second vessels when the handle of the first vessel is in the closed position and when the protuberant component is engaged to the strike component.

7. The cookware assembly according to claim 6, wherein:
    the handle of the second vessel has a length;
    the handle of the frame has a length;
    the one of the components extends along the length of the handle of the second vessel; and
    the other of the components extends along the length of the handle of the frame.

8. The cookware assembly according to claim 4, further comprising:
    the second vessel includes a bottom surface, and a continuous sidewall extending from a periphery of the bottom surface; and
    the base of the rack is a peripheral frame that corresponds to the periphery of the second vessel; and
    the peripheral frame is placed upon the bottom surface of the second vessel, the peripheral frame and the periphery of the second vessel are juxtaposed, and the peripheral frame encircles a majority of the bottom surface of the second vessel that is unobstructed by the rack and available for supporting food thereon for cooking.

9. A cookware assembly, comprising:
    a first vessel;
    a second vessel positioned removably on the first vessel;
    a rack, the rack includes a base positioned removably on the second vessel, and a frame that projects from the base, the frame includes a first member above the first and second vessels, and a food-supporting framework between base and the first member;
    a second member mounted to the first vessel for movement between an open position detached from the first member and a closed position attached to the first member;
    the first vessel, the second vessel, and the rack are separable from one another, when the second member is in the open position;
    the first vessel, the second vessel, and the rack are secured and the first member and the second member form an assembled handle above the first and second vessels, when the second member is in the closed position.

10. The cookware assembly according to claim 9, further including a detent assembly for retaining the second member to the first member when the second member is in the closed position.

11. The cookware assembly according to claim 10, wherein the detent assembly includes a protuberant component and a strike component, one of the components is carried by the first member and the other of the components is carried by the second member.

12. The cookware assembly according to claim 11, wherein:
    the first member has a length;
    the second member has a length;
    the one of the components extends along the length of the first member; and
    the other of the components extends along the length of the second member.

13. The cookware assembly according to claim 9, further comprising:
- the second vessel includes a bottom surface, and a continuous sidewall extending from a periphery of the bottom surface;
- the base of the rack is a peripheral frame that corresponds to the periphery of the second vessel; and
- the peripheral frame is placed upon the bottom surface of the second vessel, the peripheral frame and the periphery of the second vessel are juxtaposed, and the peripheral frame encircles a majority of the bottom surface of the second vessel that is unobstructed by the rack and available for supporting food thereon for cooking.

14. A cookware assembly, comprising:
- vessels, the vessels are nested releasably and one of the vessels is an outermost vessel and another one of the vessels is an innermost vessel;
- a rack, capable of supporting food thereon for cooking, positioned removably on the innermost vessel;
- a handle mounted to the outermost vessel for movement between an open position and a closed positioned attached to the rack;
- the vessels and the rack are separable from one another, when the handle is in the open position; and
- the vessels and the rack are secured, when the handle is in the closed position.

15. The cookware assembly according to claim 14, further including a detent assembly for retaining the handle to the rack when the handle is in the closed position.

16. The cookware assembly according to claim 15, wherein the detent assembly includes a protuberant component and a strike component, one of the components is carried by the handle and the other of the components is carried by rack.

17. The cookware assembly according to claim 16, wherein the rack includes a base placed upon the innermost vessel and a frame, capable of supporting food thereon, that projects from base.

18. The cookware assembly according to claim 17, wherein the frame includes a handle above the vessels for taking up the rack by hand or with an implement.

19. The cookware assembly according to claim 18, wherein the other of the components is carried by the handle of the frame, and the handle of the outermost vessel and the handle of the rack form an assembled handle above the vessels when the handle of the outermost vessel is in the closed position and when the protuberant component is engaged to the strike component.

20. The cookware assembly according to claim 19, wherein:
- the handle of the outermost vessel has a length;
- the handle of the frame has a length;
- the one of the components extends along the length of the handle of the outermost vessel; and
- the other of the components extends along the length of the handle of the frame.

21. The cookware assembly according to claim 17, further comprising:
- the innermost vessel includes a bottom surface, and a continuous sidewall extending from a periphery of the bottom surface;
- the base of the rack is a peripheral frame that corresponds to the periphery of the innermost vessel; and
- the peripheral frame is placed upon the bottom surface of the innermost vessel, the peripheral frame and the periphery of the innermost vessel are juxtaposed, and the peripheral frame encircles a majority of the bottom surface of the innermost vessel that is unobstructed by the rack and available for supporting food thereon for cooking.

22. A cookware assembly, comprising:
- vessels, the vessels are nested releasably and one of the vessels is an outermost vessel and another one of the vessels is an innermost vessel;
- a rack, the rack includes a base positioned removably on the innermost vessel, and a frame that projects from the base, the frame includes a first member above the vessels, and a food-supporting framework between base and the first member;
- a second member mounted to the outermost vessel for movement between an open position detached from the first member and a closed position attached to the first member;
- the innermost vessel, the outermost vessel, and the rack are separable from one another, when the second member is in the open position;
- the innermost vessel, the outermost vessel, and the rack are secured and the first member and the second member form an assembled handle above the vessels, when the second member is in the closed position.

23. The cookware assembly according to claim 22, further including a detent assembly for retaining the second member to the first member when the second member is in the closed position.

24. The cookware assembly according to claim 23, wherein the detent assembly includes a protuberant component and a strike component, one of the components is carried by the first member and the other of the components is carried by the second member.

25. The cookware assembly according to claim 24, wherein:
- the first member has a length;
- the second member has a length;
- the one of the components extends along the length of the first member; and
- the other of the components extends along the length of the second member.

26. The cookware assembly according to claim 22, further comprising:
- the innermost vessel includes a bottom surface, and a continuous sidewall extending from a periphery of the bottom surface;
- the base of the rack is a peripheral frame that corresponds to the periphery of the innermost vessel; and
- the peripheral frame is placed upon the bottom surface of the innermost vessel, the peripheral frame and the periphery of the innermost vessel are juxtaposed, and the peripheral frame encircles a majority of the bottom surface of the innermost vessel that is unobstructed by the rack and available for supporting food thereon for cooking.

* * * * *